J. A. THOMAS.

CHEMICAL ENGINE.

APPLICATION FILED MAR. 24, 1911.

Reissued Aug. 29, 1911.

13,288.

3 SHEETS—SHEET 1.

FIG. I.

ATTEST
E. M. Fisher
F. C. Mussun

INVENTOR
JOHN A. THOMAS.
By Fisher & Mussun ATTYS.

COLUMBIA PLANOGRAPH CO., WASHINGTON, D. C.

J. A. THOMAS.

CHEMICAL ENGINE.

APPLICATION FILED MAR. 24, 1911.

Reissued Aug. 29, 1911.

13,288.

3 SHEETS—SHEET 2.

ATTEST

E. M. Fisher

F. P. Mussum.

INVENTOR

JOHN A. THOMAS.

BY Fraser & Moser ATTYS.

COLUMBIA PLANOGRAPH CO., WASHINGTON, D. C.

J. A. THOMAS.

CHEMICAL ENGINE.

APPLICATION FILED MAR. 24, 1911.

Reissued Aug. 29, 1911.

13,288.

3 SHEETS—SHEET 3.

ATTEST

E. M. Fisher

F. P. Mussend.

INVENTOR

JOHN A. THOMAS.

BY Fisher & Moser ATTYS.

UNITED STATES PATENT OFFICE.

JOHN A. THOMAS, OF ZANESVILLE, OHIO, ASSIGNOR OF ONE-HALF TO SAMUEL A. WELLER, OF ZANESVILLE, OHIO.

CHEMICAL-ENGINE.

13,288. Specification of Reissued Letters Patent. Reissued Aug. 29, 1911.

Original No. 983,006, dated January 31, 1911, Serial No. 571,812. Application for reissue filed March 24, 1911. Serial No. 616,778.

*To all whom it may concern:*

Be it known that I, JOHN A. THOMAS, a citizen of the United States, residing at Zanesville, in the county of Muskingum and State of Ohio, have invented certain new and useful Improvements in Chemical-Engines, of which the following is a specification.

This invention relates to chemical engines, and more particularly to the kind or style of engines wherein a fire extinguishing chemical is carried in concentrated and condensed form and is adapted to be injected at a predetermined rate into a stream of water under pressure, whereby the entire stream is chemicalized, said stream of water being secured from a fire plug, a fire engine, or other source of water under pressure.

A further object of the invention is the provision of improved means for injecting the concentrated chemical into the stream, said means being driven by the water that is under pressure.

A further object of the invention is the provision of improved means for injecting into a stream of water a fire extinguishing chemical, such as bicarbonate of soda, from which the carbonic gas is released by the heat of the fire into which the stream is discharged, in contradistinction to having such carbonic acid gas released by subjecting the bicarbonate of soda to the action of an acid.

Figure 1:
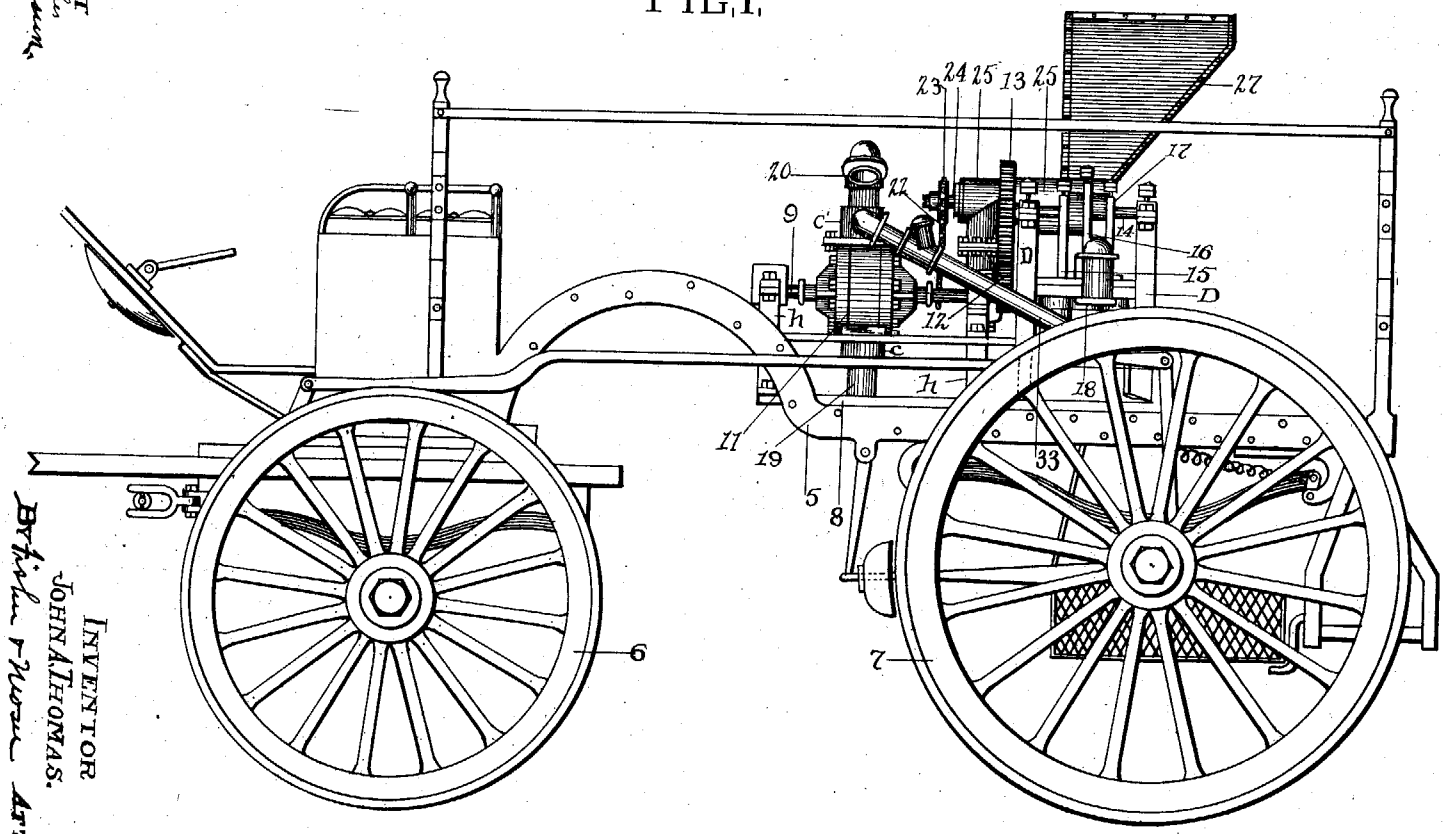
Figure 2:
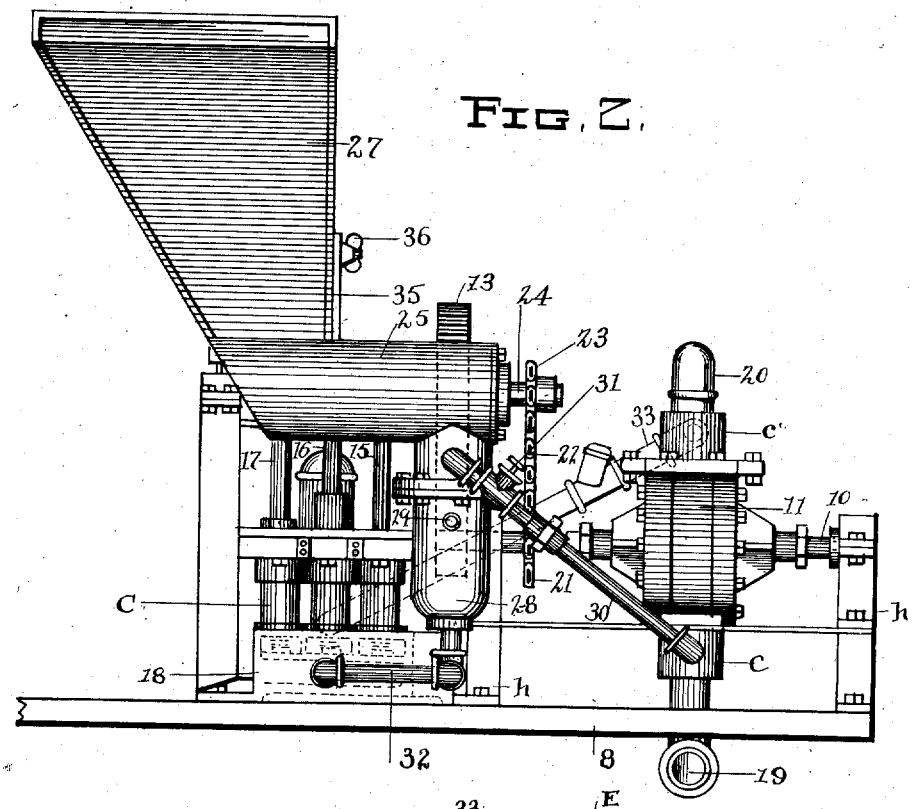
Figure 3:
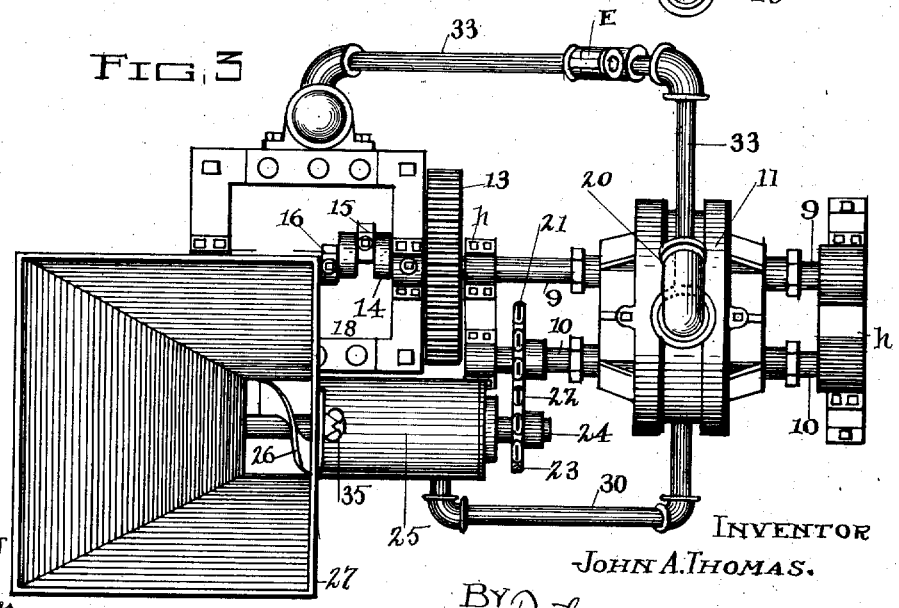
Figure 4:
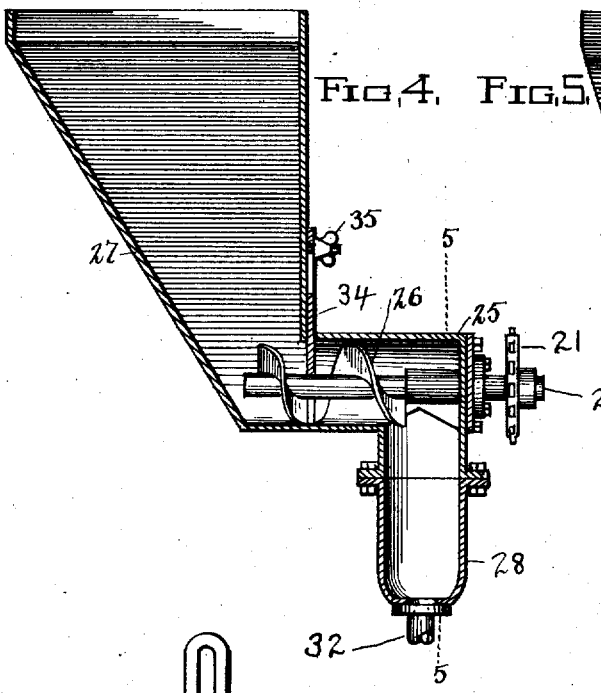
Figure 5:
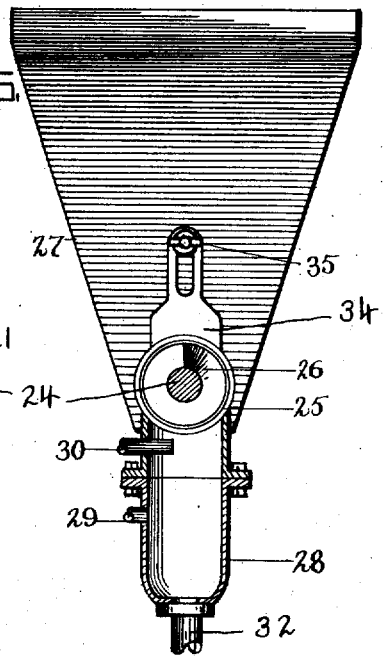
Figure 7:
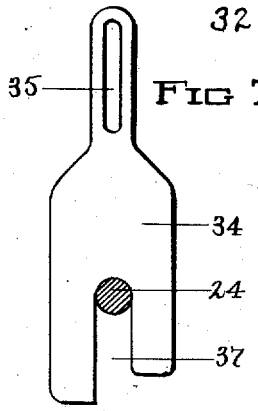
Figure 6:
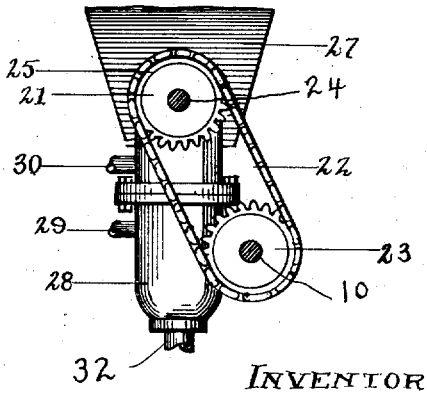

Further objects and advantages of the invention will be set forth in the detailed description which now follows:

In the accompanying drawings, Figure 1 is a side elevation of a chemical engine embodying my invention. Fig. 2 is a side elevation of a portion thereof, looking from the opposite side of the machine but omitting the running gear shown in Fig. 1. Fig. 3 is a plan view of the engine parts. Fig. 4 is a sectional elevation of the chemical supply hopper and mixing chamber; Fig. 5 is a sectional elevation substantially on line 5—5, Fig. 4, looking toward the hopper; Fig. 6 is an elevation of the mixing chamber and a portion of the hopper and of the sprocket wheels and chain which conveys power from one of the motor shafts to the chemical conveyer in the hopper as hereinafter more fully described. Fig. 7 is a detail of the slide by which the front of the chemical from the hopper to the conveyer is adapted to be governed.

The numeral 5 designates the frame of the engine which is mounted on wheels 6 and 7 in the usual and well known manner. A base frame 8 for the engine parts is carried by the frame 5. Mounted in bearings carried by the base 8 are the shafts 9 and 10 of the water motor 11. This motor is of the well known type in which two intermeshing rotary members are employed, and is located directly in the water line and driven thereby. The water comes to the motor under a high pressure, say from a fire engine, as above indicated. The said shafts 9 and 10 have different trains of mechanism connected therewith, the shaft 9 being coupled up with a tri-plex pump 18, and the shaft 10 with a chemical feed or supply mechanism, all as hereinafter fully described.

The motor casing C has a water inlet or passage by pipe or elbow 19 and a discharge or outlet by elbow 20, and a by-pass or passage for water by pipe 30 to the chemical mixing chamber 28. A suction line 32 extends from the chamber 28 to the triplex pump C and a line 3—3 from the pump delivers the chemicalized liquid by injection into the discharge line of the water. These three pipes 30, 32 and 33 form the main portion of the chemical by-pass or circuit in which the mixing chamber 28 and the pump are located.

The conveyer screw or worm 26 is mounted on shaft 24 rotatably mounted in the conveyer casing 25 and adapted to convey the dry chemical from hopper 27 forward into mixing chamber 28, subject to regulation or control by slide or door 34 according to the amount of chemical wanted at any given time. Power is communicated to shaft 24 from motor shaft 10 through sprocket wheels 21 and 23 on said shafts respectively, and sprocket chain connection 22 and the worm screw 26 are so arranged as to feed by rotating to the right and which is required by the corresponding rotation of drive shaft 10. The said sprockets 21 and 23 are of the same size so that the exact speed of the motor will always be imparted to the said conveyer, whatever its rate of rotation. Incident to this mechanism are the chemical or soda regulating slide 34 and in some measure the water controlling valve 31 in pipe 30, but assuming that the said slide and valve are set to obtain a certain quantity or flow of both water and chemical, any further supply of chemical is governed exclusively by the said conveyer, as is obvious. The mixing chamber 28 has an overflow spout 29 in its side for any excess of fluid in said chamber. Obviously it is not planned to work with an overflow at 29 but rather to provide for emergencies, and any escape of chemical solution at this point is nothing short of waste.

Returning now to the mechanism operatively connected with the motor shaft 9, we find said shaft serving the exclusive purpose of operating the pumps. To this end the said shaft 9 carries a pinion 12 which meshes with a gear 13 on pump shaft 14. The three connecting rods 15, 16 and 17 of the triplex pump 18 are actuated by or from the said shaft 14. Each pump has a cylinder C over the base 18, and the chemical solution is delivered to said base by pipe 32. From this point the solution is forced by the pumps through pipe 33 into the motor outlet 20. By using a series of pumps the supply of solution is made uniform.

In the present organization of the engine the motor is set directly in the main water passage, and the by-passage which leads to the mixing chamber and thence to the pumps and back to the discharge line starts in the head of water on the pressure side of the motor.

It is to be noted that the bicarbonate of soda is mixed with water and not with an acid which releases the carbonic acid gas from the bicarbonate of soda. In other words, the bicarbonate of soda remains bicarbonate of soda during its passage through the fire hose and until it is discharged upon the fire to be extinguished, the carbonic gas being then released by the heat of the fire. Where the carbonic acid gas is released at a distant point and is then carried to and discharged upon the fire, much of its fire extinguishing qualities are lost before it reaches the fire. By the present apparatus, I am enabled to convey the chemical in concentrated form directly to the seat of the fire, and only then is the carbonic gas released.

From the foregoing description, it will be seen that simple and efficient means are herein provided for accomplishing the objects of the invention, but while the elements shown and described are well adapted to serve the purposes for which they are intended, it is to be understood that the invention is not limited to the precise construction, set forth but includes within its purview such changes as may be made within the scope of the appended claims.

The operation of the device is as follows: Water passes under pressure into the inlet or supply 19 through the motor 11 and out through the discharge or outlet 20 to a line of fire hose from which it is discharged upon the fire to be extinguished. During its passage through the chemical engine, the entire stream is chemicalized. This is accomplished by virtue of the fact that the passage of the water through the casing 11 results in rotating shafts 9 and 10. The rotation of the shaft 10 drives the conveyer screw 26. The movement of this conveyer screw feeds a predetermined amount of chemical, such as bicarbonate of soda, into the mixing chamber 28. By opening the valve 31, water is admitted to this mixing chamber and the bicarbonate of soda in solution is drawn through pipe 32 by the triplex pump, and from said triplex pump is discharged into the outlet 20.

What I claim is:

1. A rotary water motor having a shaft and inlet and discharge lines for the water, a triplex pump and a shaft from which the units of said pump are operated successively and means operatively connecting said shafts, in combination with a dry chemical supply mechanism and a mixing chamber for chemical solution in communication therewith, a water supply line from the inlet line of said motor to said mixing chamber, a suction line from said mixing chamber to said pump and a delivery line from said pump to the discharge line of the water.

2. A chemical engine comprising a rotary motor provided with oppositely disposed inlet and discharge passages respectively, means for continuously supplying dry chemical, a chemical mixing chamber and a by-passage from the inlet of said motor discharging into said chamber, a series of force pumps and a shaft with which said pumps are operatively connected, said pumps being disposed in respect to said shaft to act successively to maintain a steady and uniform flow of the chemicalized liquid, means operatively connecting said shaft with said motor, a suction line for the liquid beginning at said mixing chamber and ending at said pumps and a delivery line from said pumps to the discharge passage of said motor.

3. In chemical engines, a rotary water motor having a shaft and oppositely disposed inlet and discharge lines, respectively, and a chamber for chemicalized liquid having a water supply connection from said motor, a pump, a suction line from said chamber to said pump and a delivery line from said pump to said discharge line of the motor, a rotary shaft operatively connected with said pump and a gear wheel thereon and a pinion on said motor shaft meshing with said gear wheel, whereby a constant supply of chemicalized fluid is maintained in the discharge line from the motor and said fluid is forced into said discharge line against back pressure therein.

4. A chemical engine comprising a rotary motor having inlet and discharge lines for water under pressure, in combination with a mixing chamber, a by-passage for water from said motor to said chamber provided with a valve to govern the flow of the water, a chemical conveyer and a casing therefor having an open discharge in its bottom into the top of said chamber for the dry chemical, power transmitting means from said motor to said conveyer, and a pump in suction relations with said mixing chamber, said mixing chamber having an overflow outlet in its side on a plane beneath the opening for the dry chemical.

5. In chemical engines, a rotary water motor having inlet and outlet passages and a shaft, a source of chemical supply and a conveyer for the chemical, power transmitting mechanism between said motor shaft and said conveyer constructed to communicate the exact speed of the motor to the conveyer, means to regulate the flow of chemical through the conveyer, a chemical mixing chamber and a by-passage around said motor discharging into said chamber and means to regulate the flow of water through said passage, in combination with a pump in suction relations with said chamber and adapted to maintain a continuous flow of the chemicalized fluid, and driving connections between said motor and said pump, said driving connections constructed to drive the chemicalized water into the main column.

6. A water motor comprising a pair of rotative shafts arranged side by side and in parallel relation to each other, a force pump driven from one of said shafts, a conveyer driven from the other of said shafts, a casing in which said conveyer is located, a hopper for containing a chemical to be conveyed by said conveyer, a mixing chamber into which said chemical is delivered by the conveyer, a suction line from the force pump to said mixing chamber, and a delivery line from said force pump to the discharge line of the water motor.

In testimony whereof I affix my signature in the presence of two witnesses.

JOHN A. THOMAS.

Witnesses:
E. F. O'Neal,
May Rarick.

Copies of this patent may be obtained for five cents each, by addressing the "Commissioner of Patents, Washington, D. C."